United States Patent
Liu

(10) Patent No.: US 8,718,370 B2
(45) Date of Patent: May 6, 2014

(54) OPTICAL INFORMATION-READING APPARATUS AND OPTICAL INFORMATION-READING METHOD

(75) Inventor: Shiping Liu, Saitama (JP)

(73) Assignee: Optoelectronics Co., Ltd. (JP)

( * ) Notice: Subject to any disclaimer, the term of this patent is extended or adjusted under 35 U.S.C. 154(b) by 392 days.

(21) Appl. No.: 13/245,248

(22) Filed: Sep. 26, 2011

(65) Prior Publication Data

US 2012/0033894 A1 Feb. 9, 2012

Related U.S. Application Data

(63) Continuation of application No. PCT/JP2010/055265, filed on Mar. 25, 2010.

(30) Foreign Application Priority Data

Mar. 27, 2009 (JP) ................................ 2009-080258

(51) Int. Cl.
  *G06K 9/00* (2006.01)
(52) U.S. Cl.
  USPC ..................................... 382/181; 235/462.08
(58) Field of Classification Search
  CPC ........................................................ G06K 9/36
  USPC ........................................ 382/172, 173, 275
  See application file for complete search history.

(56) References Cited

U.S. PATENT DOCUMENTS 5,373,147 A * 12/1994 Noda ........................ 235/462.08
6,293,466 B1 9/2001 Fujita et al.
2003/0025942 A1 * 2/2003 Atkinson ..................... 358/3.22
2004/0001648 A1 * 1/2004 Curry et al. ................... 382/302
2004/0218221 A1 * 11/2004 Hirano et al. ................ 358/3.06

FOREIGN PATENT DOCUMENTS

| JP | 59064917 | 4/1984 |
| JP | 62061176 | 3/1987 |
| JP | 03025690 | 2/1991 |
| JP | 08214519 | 8/1996 |
| JP | 09326009 | 12/1997 |
| JP | 10198755 | 7/1998 |
| JP | 2000172776 A | 6/2000 |
| JP | 2005025417 | 1/2005 |

OTHER PUBLICATIONS

International Search Report of International Application No. PCT/JP2010055265, dated Mar. 25, 2010.

* cited by examiner

*Primary Examiner* — Samir Ahmed
(74) *Attorney, Agent, or Firm* — Kaplan Breyer Schwarz & Ottesen, LLP

(57) ABSTRACT

A method and apparatus to enable a position of an image to be identified and to enable the image to be recognized reliably even when the image is unclean or external disturbance light is irradiates the image. On a assumption that a binarization threshold value is calculated for every block based on the maximum and minimum values of the brightness values in code symbol data, plural adjacent blocks, the threshold values of which are calculated, are grouped to generate groups. The area of each of the groups thus generated is compared with a predetermined area for a comparison standard and if the area of each of the groups thus compared is larger than that, these groups are selected. The position of the selected groups is identified. Brightness value of the code symbol data are binarized using the threshold value for every block in the selected groups.

7 Claims, 10 Drawing Sheets

FIG.3

| B00 | B01 | B02 | . . . . . . . | B0n |
|-----|-----|-----|---------------|-----|
| B10 | B11 | B12 | . . . . . . . | B1n |
| B20 | B21 | B22 | . . . . . . . | B2n |
| .   | .   | .   |               | .   |
| .   | .   | .   |               | .   |
| .   | .   | .   |               | .   |
| .   | .   | .   |               | .   |
| Bm0 | Bm1 | Bm2 | . . . . . . . | Bmn |

FIG.4

OPTICAL INFORMATION-READING APPARATUS AND OPTICAL INFORMATION-READING METHOD

This patent application is a continuation of International Application No. PCT/JP2010/055265 filed Mar. 25, 2010 and designating the United States of America. This international application was published in Japanese on Sep. 3, 2010 under No. WO 2010/110385 A1. This international application is hereby incorporated by reference in its entirety.

BACKGROUND ART OF THE INVENTION

The present invention relates to an optical information-reading apparatus such as a code scanner, an optical character reader (OCR), or the like, and an optical information-reading method.

A bar code has been used previously for merchandise control, stock management, or the like. As a code symbol that has more increased information density than this bar code, there have been two-dimensional codes such as Data Matrix, QR code, PDF417, Maxi Code, and the like. An apparatus for reading these two-dimensional codes captures the two-dimensional codes with a solid-state image sensing device such as a CMOS image sensor, a CCD image sensor, or the like, and performs various kinds of processing on such a captured two-dimensional code to binarize and decode it.

In the optical character reader (hereinafter referred to as OCR), a principle to read the character is also the same as a principle to read the code. A camera included in a recent portable phone has a built-in code scanner and an OCR so that the code scanner and the OCR use have been widespread. In such a code scanner or such an OCR performances is fixed based on a binarizing function which the code scanner or the OCR has.

In patent document 1 (see below), an image processing apparatus is disclosed which performs binarization processing using an error diffusion method. According to this image processing apparatus, an image read by a scanner is partitioned into blocks. The binarization processing is performed by setting a weighting coefficient, taking contrast between the adjacent blocks into consideration, and setting a threshold value calculated from maximum and minimum values based on the set weighting coefficient.

In patent document 2 (see below), an optical information-reading apparatus that performs binarization processing by run-length processing is disclosed. According to this optical information-reading apparatus, an image read by a scanner is partitioned into lines. For example, a data conversion is performed on the line data so that it is "one pixel of black, two pixels of white, five pixels of black, three pixels of white and five pixels of black". The binarization processing is performed by setting a threshold value calculated from maximum and minimum values based on the line data thus derived.

In patent document 3 (see below), a binarization method is disclosed in which, between two black peaks (minimum values) adjacent to a white peak (maximum value), a value of this white peak is set to a direct current level; between two white peaks adjacent to a black peak, a value of this black peak is set to a direct current level; and a value between two direct current levels thus obtained is set to a threshold level. According to this binarization method, since the threshold level is set at the value between black and white peaks which is the nearest in an analog image signal to be binarized, a correct binarized signal is obtained even if a portion of low frequency component contained in the analog image signal is large or a frequency of the necessary signal is low.

In patent document 4 (see below), an apparatus for excising a specified serial number from a number plate is disclosed in which a threshold value is set from the largest minimum value among plural minimum values and the smallest maximum value among plural maximum values, the values being detected by a detection means According to this apparatus for excising a specified serial number, a stable binarized image can be obtained regardless of the area of the number plate in the image.

FIG. 15 is a diagram for illustrating a conventional calculation example of a threshold value. As shown in FIG. 15, the horizontal axis is a coordinate x and the vertical axis is the brightness value of a read image Further, the brightness value shown in FIG. 15 is considered to be contained in one block. The conventional calculation method of a threshold value is calculated by obtaining the maximum and minimum values in one block. For example, in FIG. 15, a brightness value corresponding to a point c is the maximum value Amax, and a brightness value corresponding to a point d is the minimum value Amin. A threshold value Ath is the mean value of the maximum value Amax and the minimum value Amin, which is calculated as $Ath = (Amax + Amin)/2$.

For example, if the brightness value is larger than the threshold value Ath, the binarized signal is estimated as one (white) but if the brightness value is smaller than the threshold value Ath, the binarized signal is estimated as zero (black). Thus, since the brightness value corresponding to the point "a" is a larger value than the threshold value Ath, it is estimated as one (white); since the brightness value corresponding to the point "b" is a larger value than the threshold value Ath, it is estimated as one (white); since the brightness value corresponding to the point "c" is a larger value than the threshold value Ath, it is estimated as one (white); and since the brightness value corresponding to the point "d" is a smaller value than the threshold value Ath, it is estimated as zero (black). However, a binarized signal of the brightness value corresponding to the point "b" should essentially be recognized as zero (black) but when calculating the threshold value using such a method, it is recognized as one (white) by mistake.

PATENT DOCUMENTS

Patent Document 1: Japanese Patent Application Publication No. H08-214159
Patent Document 2: Japanese Patent Application Publication No. 2005-25417
Patent Document 3: Japanese Patent Application Publication No. S59-64917
Patent Document 4: Japanese Patent Application Publication No. H09-326009

SUMMARY

By the way, according to patent document 1, the patent document 2 and the conventional example, the threshold value for the binarization is calculated from the maximum and minimum values of the brightness value in the image but, if there is a large difference between the brightness values in the one block, the threshold value may be calculated mistakenly. It is also impossible to identify the position of the image. This causes the image to be recognized mistakenly.

According to patent document 3, the threshold value is calculated from the maximum and minimum values, which are adjacent to each other, but it is impossible to identify the position of the image so that the image may be recognized mistakenly.

According to patent document 4, the threshold value is calculated from the smallest maximum value and the largest minimum value but it is impossible to identify the position of the image so that the image may be recognized mistakenly.

The present invention solves the above-mentioned problems and has, as an object, to provide an optical information-reading apparatus and an optical information-reading method which can recognize the image reliably even when the image is unclean or external disturbance light irradiates the image, and it is an object to identify the position of an image.

In order to solve the above-mentioned problems, an optical information-reading apparatus embodying to the present invention includes an image-capturing which converts the image to image data that is represented by a digital brightness value, a partitioning means for partitioning this image data into blocks, a brightness-values-measuring means measuring brightness values of the image data partitioned into blocks for every line, an extreme-values-detecting means comparing the brightness values of the image data of each block measured by the brightness-values-measuring means for every line and detecting maximum and minimum values thereof, a threshold-value-calculator calculating a binarization threshold value for every block based on the maximum and minimum values detected by the extreme-values-detecting means, an extreme-values-grouping means grouping plural adjacent blocks, the threshold values of which are calculated by the threshold-value-calculator, to generate groups, a groups-selecting means comparing the groups generated by the extreme-values-grouping means with a predetermined size to determine whether or not the groups are larger than the predetermined size and selecting the groups if they are larger than the predetermined size, and a binarization means for binarizing the brightness value of the image data with the threshold value for every block in the groups selected by the groups-selecting means.

Further, an optical information-reading method embodying the present invention comprises the steps of capturing an image by converting it to image data that is represented by a digital brightness value, partitioning the image data into blocks, measuring the partitioned image data for every line, comparing the brightness values of the image data of each block measured for every line and detecting maximum and minimum values thereof, calculating a binarization threshold value for every block based on the detected maximum and minimum values, grouping plural adjacent blocks for the threshold values of which were calculated to generate groups, comparing the area of each of the generated groups with a predetermined area for a comparison standard, and selecting a group if its area is larger than the predetermined area and binarizing the brightness value of the image data with the threshold value for every block in selected groups.

In the optical information-reading apparatus and the optical information-reading method embodying the invention, an image is captured to convert the image to image data that is represented by a digital brightness value, the image data thus converted is partitioned into blocks, the brightness values of the partitioned image data are measured for every line, the brightness values of the image data of each block measured for every line are compared to detect maximum and minimum values thereof, and a binarization threshold value is calculated for every block based on the maximum and minimum values thus detected. Plural adjacent blocks, the threshold values of which are calculated, are grouped to generate groups, and the area of each of the groups thus generated is compared with a predetermined area for a comparison standard. If the area of a compared group is larger than the predetermined area, the group is selected and the brightness value of the image data is binarized with the threshold value for every block in the selected groups. Accordingly, if the area of each of the groups is smaller than the predetermined area, the groups are not selected and the image data of the block can be canceled.

Since the binarization threshold value is calculated for every block from the maximum and minimum values of the brightness values in the image data to binarize the brightness value, it becomes possible to recognize the image reliably even when the image is unclean or external disturbance light irradiates the image. Further, since the extreme-values-grouping means and the cluster-of-groups-selecting means are provided in order to identify the position of the code symbol, it becomes possible to identify the position of the code symbol.

With the optical information-reading apparatus and the optical information-reading method embodying the invention, it is possible to recognize the image reliably and to increase the speed of image processing. Further, since it is possible to identify the position of the code symbol, it is possible to recognize the code symbol more reliably. As a result thereof it is possible to provide an optical information-reading apparatus which has a low-cost and high performance.

BRIEF DESCRIPTION OF THE DRAWINGS

FIG. 3 is a diagram for showing an example of a partition into blocks by a partitioning means 72.

FIG. 4 is a diagram for showing a measurement example of brightness values by brightness-values-measuring means 73.

DETAILED DESCRIPTION

The following will describe an optical information-reading apparatus embodying the invention with reference to drawings. In this embodiment, a code scanner 1 will be described as one example of the optical information-reading apparatus.

First Embodiment

Configuration Example of Code Scanner 1

Figure 1:
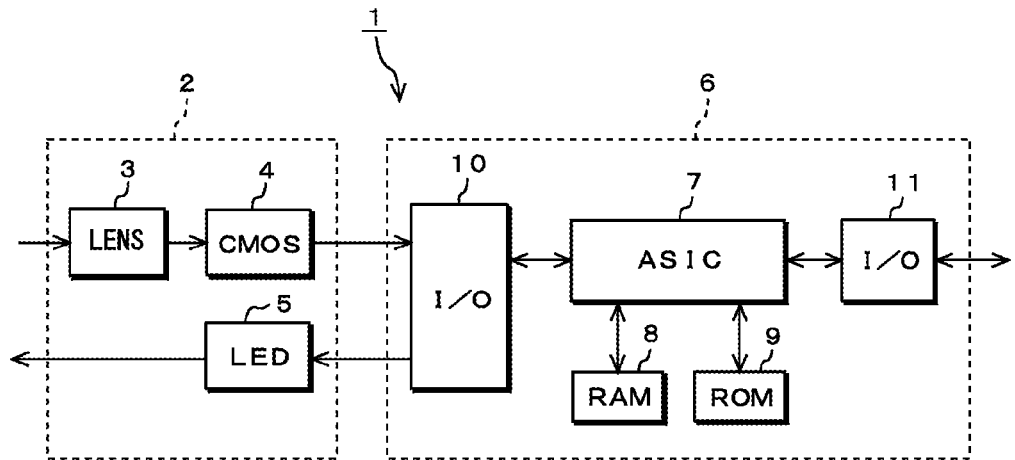
FIG. 1 is a block diagram of a code scanner 1 according to a first embodiment for showing a configuration example thereof

As shown in FIG. 1, the code scanner 1 according to this embodiment is composed of an optical head portion 2 and a decoder portion 6. The optical head portion 2 is provided with a lens 3 and a CMOS image sensor (hereinafter referred to as "CMOS 4") which is an example of a solid-state image sensing device. Further, the optical head portion 2 has LED 5 which is an example of optical source.

The lens 3 is, for example, an optical lens and captures a code symbol, which is an image such as a two-dimensional code, not shown, in the optical head portion 2. CMOS 4 is provided on the lens 3. CMOS 4 images the code symbol that the lens 3 captures, converts the imaged code symbol from analog code symbol data to code symbol data which is represented by a digital brightness value, and outputs it to the decoder portion 6.

LED 5 is provided near the lens 3. LED 5 is controlled by ASIC 7, which will be described later, so as to be lighted. LED 5 irradiates the code symbol when capturing the code symbol in the optical head portion 2 by the lens 3. Irradiating the code symbol by LED 5 enables clearer code symbol to be captured in the optical head portion 2. It is to be noted that since the code scanner 1 according to the embodiment can recognize the code symbol reliably, which will be described later, LED 5 may be omitted. This enables the code scanner 1 to be made compact. Further, since ASIC 7, which will be described later, need not control LED 5, it is possible to reduce a burden of ASIC 7.

The decoder portion 6 is provided with ASIC 7, RAM and ROM, which are examples of storage means, a first I/O interface (hereinafter, referred to as "I/O 10") and a second I/O interface (hereinafter, referred to as "I/O 11").

Figure 2:
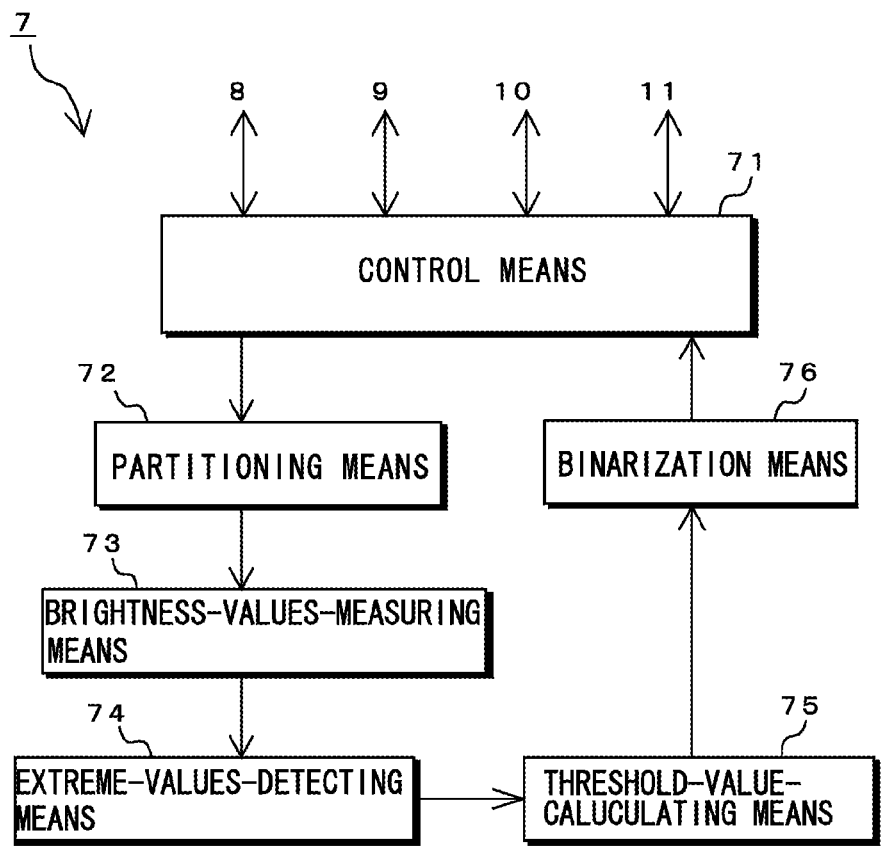
FIG. 2 is a block diagram of ASIC 7 for showing a configuration example thereof.

ASIC 7 controls CMOS 4 and LED 5, calculates a threshold value and performs a binarization, which will be described later in connection with FIG. 2. To ASIC 7, RAM 8 and ROM 9 are connected. RAM 8 stores code symbol data and various kinds of data such as noise information which will be described later in connection with FIG. 8. ROM 9 stores a program, which boots up the code scanner 1, or the like.

Further, to ASIC 7, I/O 10 and I/O 11 are connected. I/O 10 is an interface for performing data communication with the optical head portion 2. To I/O 10, CMOS 4 and LED 5 are connected and it outputs code symbol data outputted from CMOS 4 to ASIC 7 and outputs a lighting signal for allowing LED 5 to light, which is outputted from ASIC 7, to LED 5.

I/O 11 is an interface for performing data communication with any external device. For example, to I/O 11, a host computer, not shown, is connected and I/O 11 sends to the host computer code symbol data which has been binarized by ASIC 7. The host computer receives the binarized code symbol data and performs various kinds of processing thereon.

Configuration Example of ASIC

Next, the following will describe the configuration example of ASIC 7. As shown in FIG. 2, ASIC 7 has a control means 71, a partitioning means 72, a brightness-values-measuring means 73, an extreme-values-detecting means 74, a threshold-value-calculating means 75 and a binarization means 76.

The control means 71 is connected to RAM 8, ROM 9, I/O 10 and I/O 11. The control means 71 reads out a boot-up program stored in ROM 9 to boot up the code scanner 1. The control means 71 receives code symbol data outputted from CMOS 4 through I/O 10 and stores it on RAM 8.

To the control means 71, the partitioning means 72 is connected. The partitioning means 72 partitions the code symbol data stored on RAM 8 into blocks. The partitioning means 72 partitions the code symbol data into, for example, blocks B00 through Bmn of (m+1)×(n+1) pieces as shown in FIG. 3. The number of blocks B00 through Bmn is suitably set based on the number of pixels in CMOS 4, data processing performance of ASIC 7, and the like.

To the partitioning means 72, the brightness-values-measuring means 73 is connected. The brightness-values-measuring means 73 measures brightness values of the code symbol data partitioned into blocks by the partitioning means 72 for every line. The brightness-values-measuring means 73 measures brightness values of the code symbol data on, for example, horizontal scanning lines J1 through Jq of q pieces and vertical scanning lines K1 through Kr of r pieces as shown in FIG. 4. Thus, when measuring the brightness values of the code symbol data on the horizontal scanning lines J1 through Jq and the vertical scanning lines K1 through Kr, the brightness value is measured plural times for one block so that it is possible to measure the brightness value more accurately.

The numbers of the horizontal scanning lines J1 through Jq and the vertical scanning lines K1 through Kr are suitably set based on the number of pixels in CMOS 4, data processing performance of ASIC 7, and the like. For example, if q>m and r>n, the number of scanning lines is more than that of blocks so that it is possible to measure the brightness values of code symbol data more accurately. Further, if q<m and r<n, the number of scanning lines is less than that of blocks so that it is possible to measure the brightness values thereof in a short time.

Figure 5:
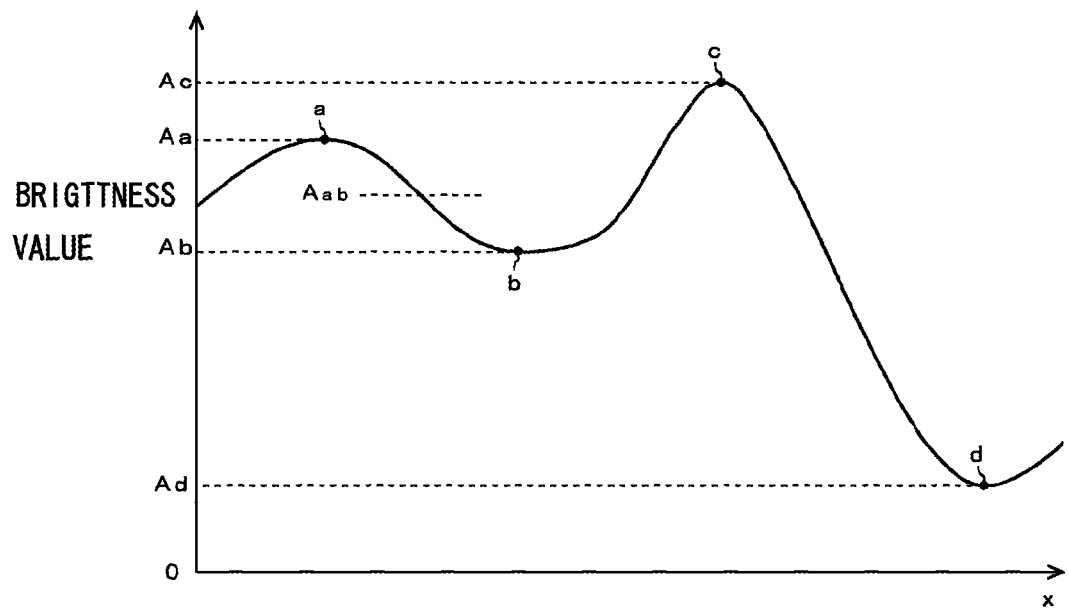
FIG. 5 is a diagram for showing a detection example of the maximum and minimum values by the extreme-values-detecting means 74.

To the brightness-values-measuring means 73, the extreme-values-detecting means 74 is connected. The extreme-values-detecting means 74 compares the brightness values of the code symbol data of each block measured by the brightness-values-measuring means 73 for every line and detects extreme values (maximum and minimum values) thereof. FIG. 5 is a graph illustrating brightness values in one block of one line among the horizontal scanning lines J1 through Jq measured by the brightness-values-measuring means 73 where the horizontal axis is a coordinate x and the vertical axis is the brightness value of the code symbol data. As shown in FIG. 5, the brightness value indicates its maximum values at points "a" and "c" and it indicates its minimum values at points "b" and "d". A brightness value corresponding to a position of the point "a" is the maximum value Aa, a brightness value corresponding to a position of the point "b" is the minimum value Ab, a brightness value corresponding to a position of the point "c" is the maximum value Ac and a brightness value corresponding to a position of the point "d" is the minimum value Ad. The extreme-values-detecting means 74 scans on the scanning line shown in FIG. 5, for example, from left to right in order to detect the maximum values Aa, Ac and the minimum values Ab, Ad.

In the code scanner 1 according to this embodiment, one threshold value is set in one block. In this case, the extreme-values-detecting means 74 selects only one pair of maximum and minimum values in one block If there are plural maximum and minimum values in one block partitioned by the partitioning means 72, the extreme-values-detecting means 74 selects the smallest maximum value among the plural maximum values and the largest minimum value among the plural minimum values. For example, in FIG. 5, the extreme-values-detecting means 74 selects the maximum value Aa as its maximum value because when comparing the maximum values Aa and Ac, the maximum value Aa is smaller. It selects the minimum value Ab as its minimum value because when comparing the minimum values Ab and Ad, the minimum value Ab is larger.

To the extreme-values-detecting means 74, the threshold-value-calculating means 75 is connected. The threshold-value-calculating means 75 calculates a binarization threshold value based on the maximum value Aa and the minimum value Ab of the brightness values of code symbol data detected by the extreme-values-detecting means 74. The threshold-value-calculating means 75 calculates the mean value of the maximum value Aa and the minimum value Ab. This means value is the binarization threshold value Aab. In other words, the threshold value Aab is calculated from Aab=(Aa+Ab)/2.

To the threshold-value-calculating means 75, the binarization means 76 is connected. The binarization means 76 binarizes the brightness value of the code symbol data from the threshold value Aab calculated by the threshold-value-calculating means 75. Since the binarization is performed on the basis of the threshold value Aab, a brightness value corresponding to the point "a" is larger than the threshold value Aab so that a binarized signal is estimated as one (white). A brightness value corresponding to the point "b" is smaller than the threshold value Aab so that a binarized signal is estimated as zero (black). A brightness value corresponding to the point "c" is larger than the threshold value Aab, a binarized signal is estimated as one (white). A brightness value corresponding to the point "d" is smaller than the threshold value Aab, a binarized signal is estimated as zero (black).

To the binarization means 76, the control means 71 is connected. The control means 71 outputs the code symbol data binarized by the binarization means 76 to an external device, such as the host computer, through I/O 11.

Operation Example of ASIC 7

Figure 6:
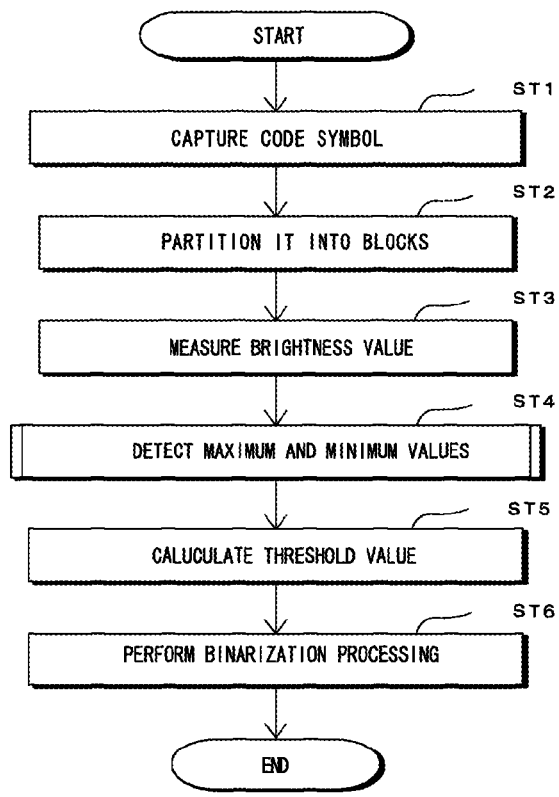
FIG. 6 is a flow chart for showing an operation example of ASIC 7.

Next, the following will describe an operation example of ASIC 7 using a flow chart of the operation therefor. As shown in FIG. 6, at a step ST1, ASIC 7 outputs a control signal to the optical head portion 2 so as to capture the code symbol so that the code symbol is captured by the optical head portion 2. The captured code symbol is converted by CMOS 4 from the analog code symbol data to the code symbol data that is represented by a digital brightness value.

The operation goes to step ST2 in which the code symbol data converted by CMOS 4 is outputted to ASIC 7 through I/O 10 of the decoder portion 6. The code symbol data is partitioned by the partitioning means 72 provided in ASIC 7 into, for example, blocks B00 through Bmn of (m+1)×(n+1) pieces, as shown in FIG. 3.

The operation goes to a step ST3 in which brightness values of the code symbol data partitioned by the partitioning means 72 are measured by the brightness-values-measuring means 73 on, for example, the horizontal scanning lines J1 through Jq and vertical scanning lines K1 through Kr, as shown in FIG. 4.

The operation goes to a step ST4 in which the extreme-values-detecting means 74 scans the brightness values of the code symbol data of each block from left to right in order and compares the scanned brightness values, respectively, to detect maximum and minimum values thereof, as shown in FIG. 5. A detected example of the extreme values by the extreme-values-detecting means 74 will be described later with reference to FIG. 7.

The operation goes to a step ST5 in which the threshold-value-calculating means 75 calculates a binarization threshold value based on the maximum value and the minimum value detected by the extreme-values-detecting means 74. This threshold value is the mean value of the maximum value and the minimum value, Which are adjacent to each other.

The operation goes to a step ST6 in which the brightness value of the code symbol data is binarized by the binarization means 76 using the threshold value calculated by the threshold-value-calculating means 75. The binarized code symbol data is outputted to the host computer, or the like, which is the external device, through I/O 11 of the decoder portion 6. The host computer performs various kinds of processing on the binarized code symbol data.

Operation Example of Extreme-Values-Detecting Means 74

Figure 7:
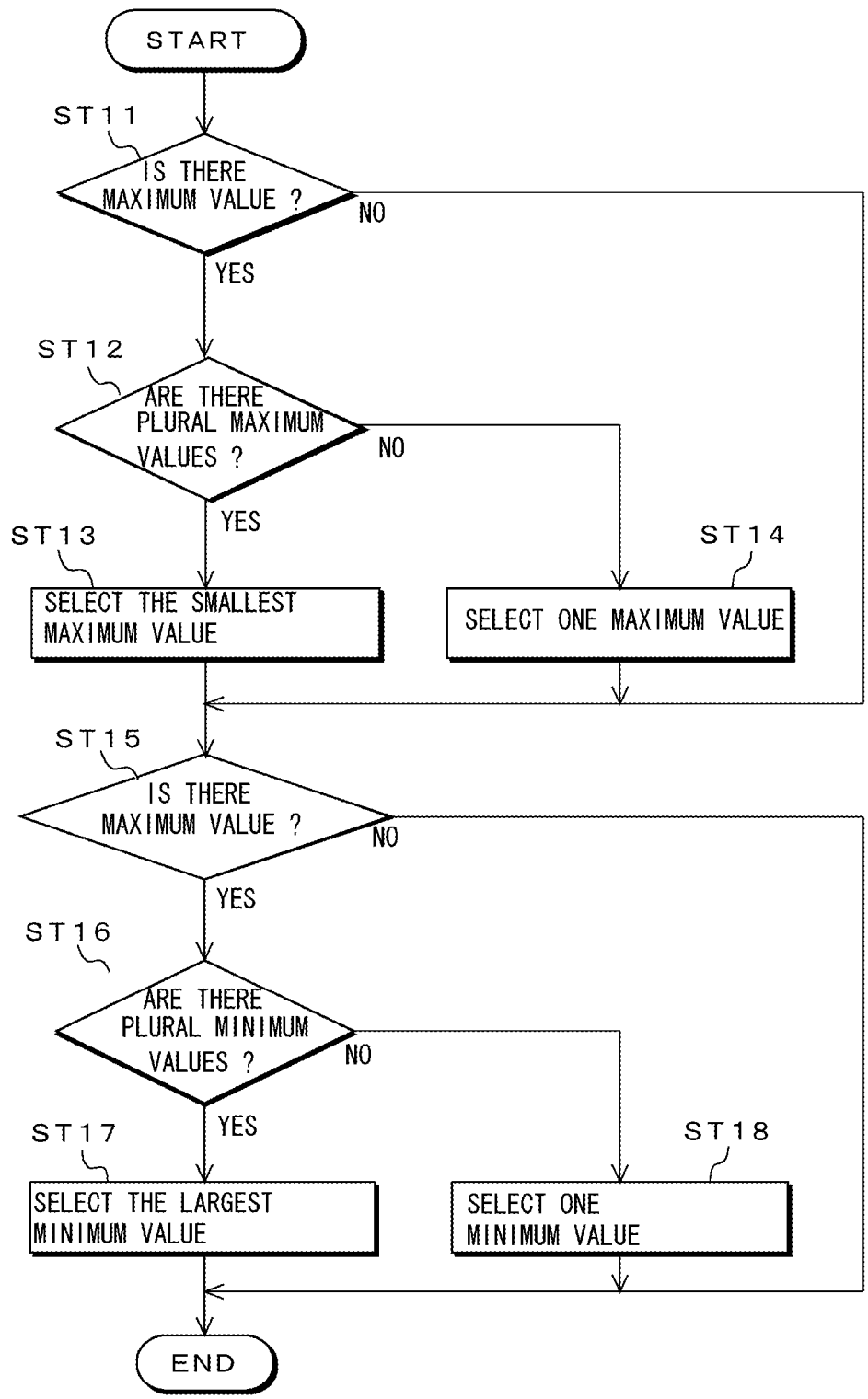
FIG. 7 is a flow chart for showing an operation example of the extreme-values-detecting means 74.

Next, will be described an operation example of the extreme-values-detecting means 74 using a flow chart of the operation therefor. As shown in FIG. 7, at a step ST11, the extreme-values-detecting means 74 detects whether or not there is a maximum value in one block If there is a maximum value in one block, then the operation goes to a step ST12. If there is no maximum value in one block, then the operation goes to a step ST15.

At the step ST12, the extreme-values-detecting means 74 detects whether or not there are plural maximum values in one block If there are plural maximum values in one block, then the operation goes to a step ST13. If there are no plural maximum values in one block, then the operation goes to a step ST14.

At the step ST13, the extreme-values-detecting means 74 selects the smallest maximum value among the plural maximum values in one block. For example, in FIG. 5, it compares the maximum values Aa and Ac and selects the maximum value Aa.

At the step ST14, since there is only one maximum value in one block, the extreme-values-detecting means 74 selects this one maximum value.

At a step ST15, the extreme-values-detecting mans 74 detects whether or not there is a minimum value in one block. If there is a minimum value in one block, then the operation goes to a step ST16. If there is no minimum value in one block, then the operation goes to the step ST5 shown in FIG. 6.

At the step ST16, the extreme-values-detecting means 74 detects whether or not there are plural minimum values in one block. If there are plural minimum values in one block, then the operation goes to a step ST17. If there are no plural minimum values in one block, then the operation goes to a step ST18.

At the step ST17, the extreme-values-detecting means 74 selects the largest minimum value among the plural minimum values in one block. For example, in FIG. 5, it compares the minimum values Ab and Ad and selects the maximum value Ab and the operation goes to the step ST5 shown in FIG. 6.

At the step ST18, since there is only one minimum value in one block, the extreme-values-detecting means 74 selects this one minimum value and the operation goes to the step ST5 shown in FIG. 6.

Thus, in the code scanner 1 according to this embodiment, the optical head portion 2 captures the code symbol to convert the code symbol from analog code symbol data to code symbol data that is represented by a digital brightness value. The partitioning means 72 partitions the converted code symbol data into blocks. The brightness-values-measuring means 73 measures brightness values of the code symbol data partitioned into blocks for every line. The extreme-values-detecting means 74 compares the brightness values of the code symbol data of each block measured for every line and detects maximum and minimum values thereof. The threshold-value-calculating means 75 calculates a mean value from the detected maximum and minimum values of the brightness values of the code symbol data and calculates the threshold value for every block. The binarization means 76 binarizes the brightness value of the code symbol data with the binarization threshold value thus calculated.

Accordingly, since the code scanner 1 calculates the binarization threshold value from the maximum and minimum values of the brightness values of the code symbol dam, it becomes possible to recognize the code symbol reliably even when the code symbol is unclean or any external disturbance light irradiates the code symbol.

As a result, the code scanner 1 can recognize the code symbol reliably, thereby enabling the speed of image processing to be increased. Further, since the above-mentioned processing is configured so that no complicated processing is performed, rapid processing can be realized.

Second Embodiment

In this embodiment, there will be described ASIC 7A which is provided with an extreme-values-detecting means 74A removing a noise from the brightness values. Since elements having names and signs like those of the above-mentioned embodiment have like functions, the explanation thereof will be omitted.

Configuration Example of ASIC 7A

Figure 8:
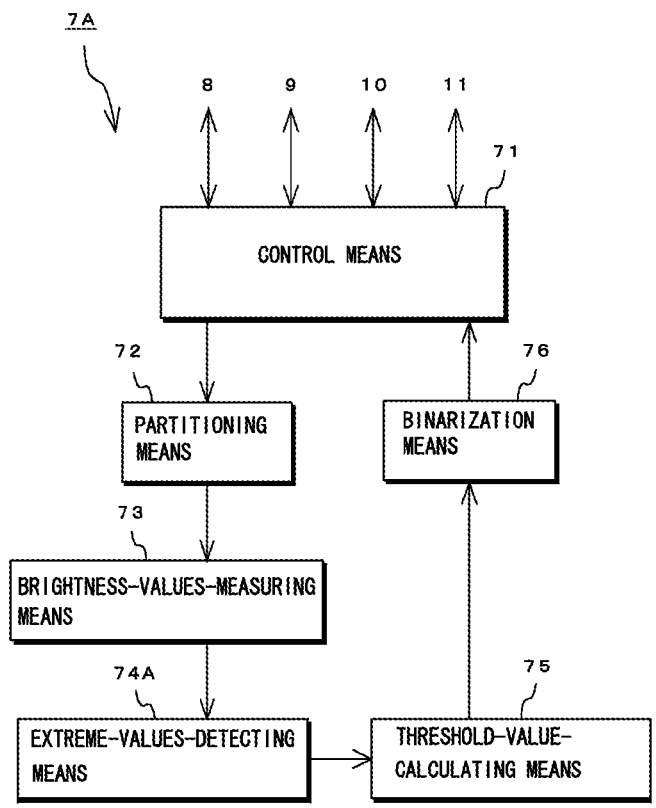
FIG. 8 is a block diagram of ASIC 7A according to a second embodiment for showing a configuration example thereof.

As shown in FIG. 8, ASIC 7A according to this embodiment has a control means 71, a partitioning means 72, a brightness-values-measuring means 73, an extreme-values-detecting means 74A, a threshold-value-calculating means 75 and a binarization means 76.

The extreme-values-detecting means 74A is provided between the brightness-values-measuring means 73 and the threshold-value-calculating means 75. The extreme-values-detecting means 74A has a function to detect the extreme values like the above-mentioned extreme-values-detecting means 74 and a function to remove any noise from the code symbol data captured by the decoder portion 6.

Figure 9:
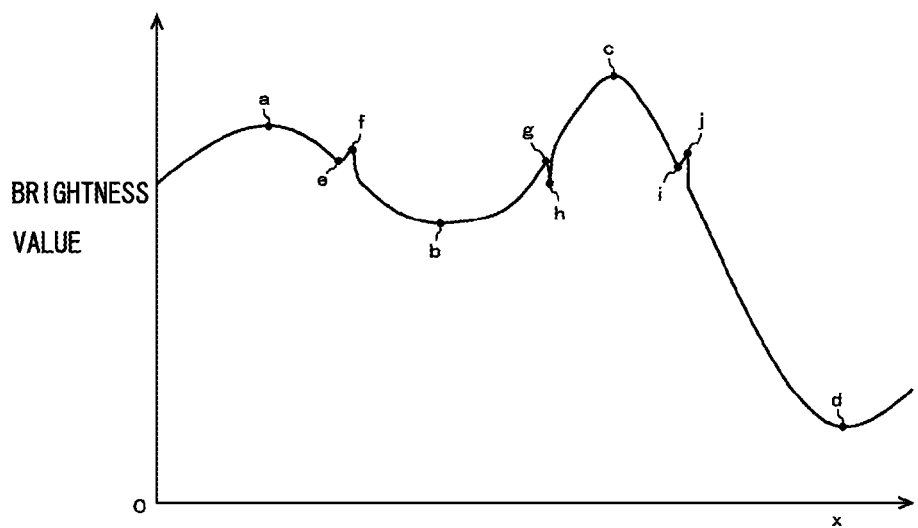
FIG. 9 is a diagram for showing a detection example of the maximum and minimum values by the extreme-values-detecting means 74A.

FIG. 9 is a graph illustrating brightness values in one block of one line among the horizontal scanning lines J1 through Jq measured by the brightness-values-measuring means 73, where the horizontal axis is a coordinate x and the vertical axis is a brightness value of the code symbol data. As shown in FIG. 9, noises (brightness values corresponding to points "e", "f", "g", "h", "i", and "j") is included in the scanning line of brightness values.

The extreme-values-detecting means 74A scans the scanning line shown in FIG. 9, for example, from left to right in order to detect the maximum value(s) of the brightness values and the minimum value(s) thereof. In FIG. 9, the extreme-values-detecting means 74A detects the maximum values corresponding to the points "a", "f", "g", "c" and "j" and the minimum values corresponding to the points "e", "b", "h", "i" and "d".

The extreme-values-detecting means 74A compares the detected maximum and minimum values with a noise standard value previously stored in RAM 8 or ROM 9 to determine whether or not the maximum and minimum values are noise. The noise standard value is previously stored in RAM 8 or ROM 9 when manufacturing the code scanner 1. The noise standard value may also be created based on the noise in the code symbol data which has been last measured by the brightness-values-measuring means 73.

The extreme-values-detecting means 74A determines that if the difference between the maximum and minimum values which are adjacent to each other is smaller than the noise standard value, these maximum and minimum values are noise. For example, the difference between the points "e" and "f", the difference between the points "g" and "h" and the difference between the points "i" and "j" are smaller than the noise standard value. Therefore, it is determined by the extreme-values-detecting means 74A that the brightness values corresponding to the points "e", "f", "g", "h", "i" and "j" are noise. The brightness values corresponding to the points "e", "f", "g", "h", "i" and "j", which are determined as noise, are removed by the extreme-values-detecting means 74A.

Operation Example of ASIC 7A

Figure 10:
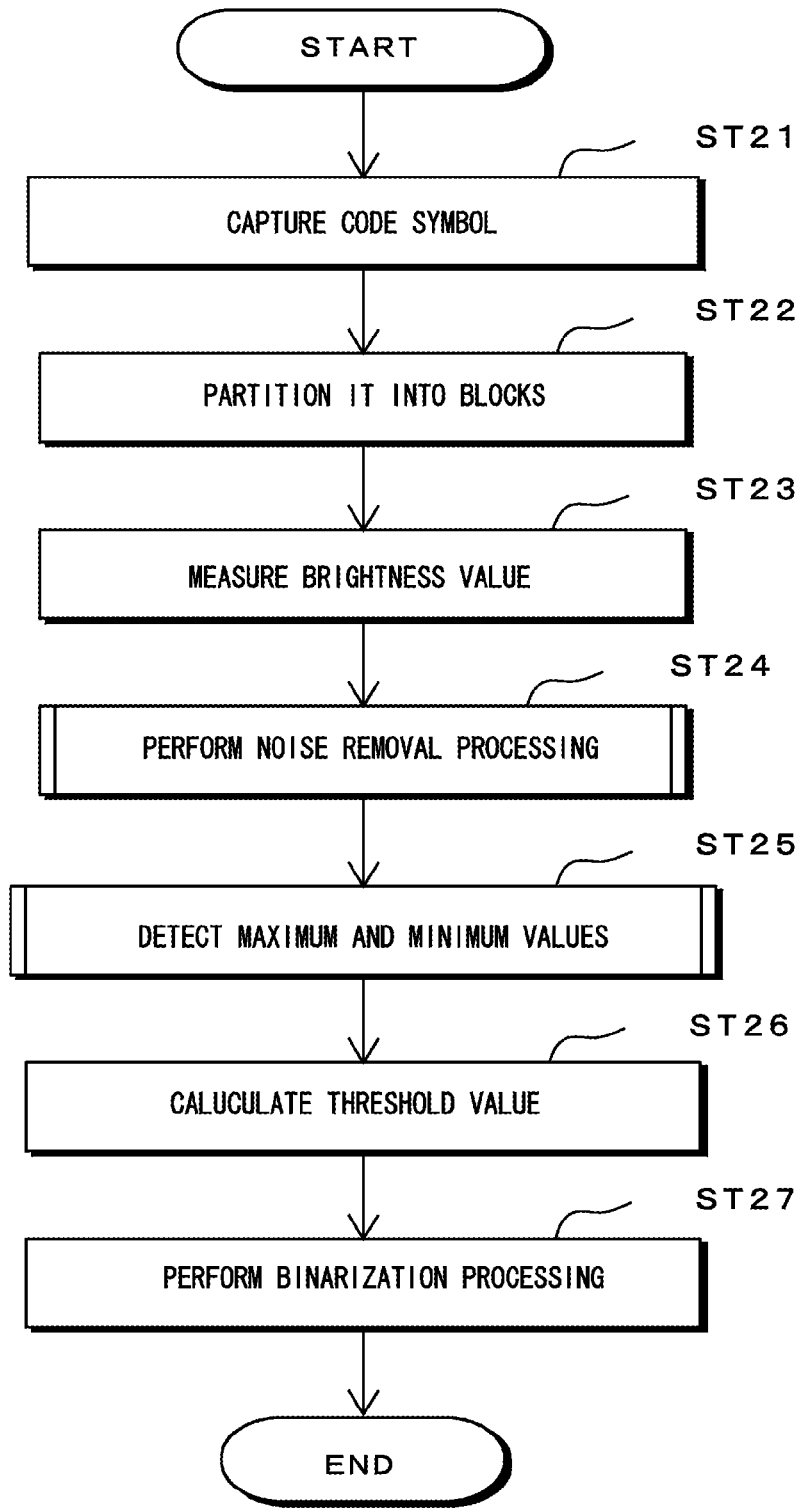
FIG. 10 is a flow chart for showing an operation example of ASIC 7A.

Next, the following will describe an operation example of ASIC 7A using a flow chart therefor. As shown in FIG. 10, steps ST21 through ST23, ST26 and ST27 are identical to the steps ST1 through ST3, ST5 and ST6 shown in FIG. 6 as described above, the explanation of which will be omitted.

At a step ST24, the noise is removed from the brightness values of the code symbol data by the extreme-values-detecting means 74A. An operation example of the extreme-values-detecting means 74A will be described later in connection with FIG. 11.

The operation goes to a step ST25 in which the extreme-values-detecting means 74A detects the maximum and minimum values in the brightness values of the code symbol data from which the noise is removed. This detection operation is identical to the detection operation described in connection with FIG. 7.

Operation Example of Extreme-Values-Detecting Means 74A

Figure 11:
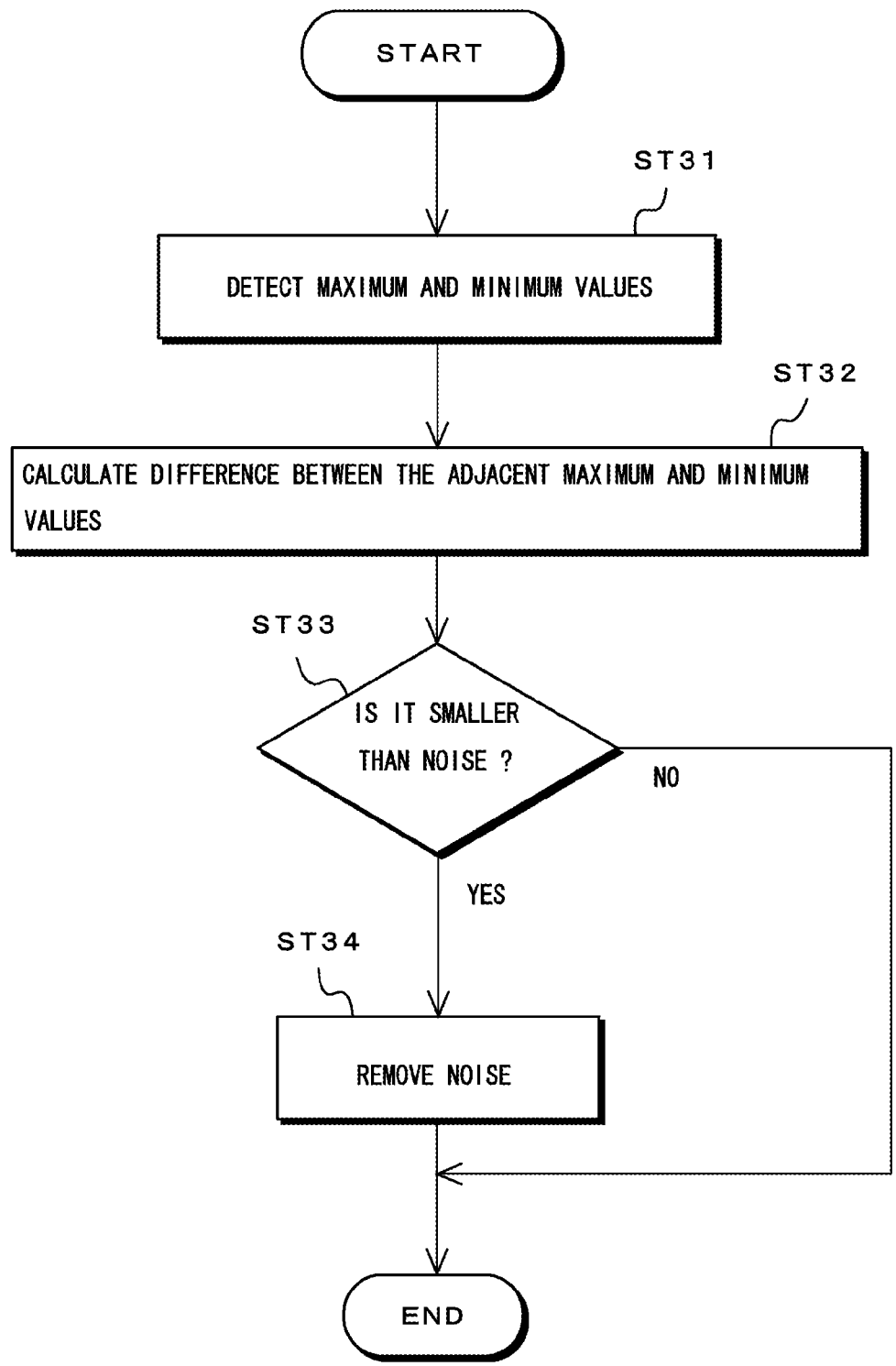
FIG. 11 is a flow chart for showing an operation example of the extreme-values-detecting means 74A.

Next, will be described operation example of the extreme-values-detecting means 74A using a flow chart therefor. As shown in FIG. 11, at a step ST31, the extreme-values-detecting means 74A detects the maximum and minimum values in the brightness values. For example, in FIG. 9, the extreme-values-detecting means 74A scans on the scanning line from left to right in order to detect the maximum values in the brightness values corresponding to the points "a", "f", "g", "c" and "j" and the minimum values in the brightness values corresponding to the points "e", "b", "h", "i" and "d".

The operation goes to a step ST32 in which the extreme-values-detecting means 74A calculates the differences between the maximum value and the minimum value which are adjacent to each other. For example, in FIG. 9, the extreme-values-detecting means 74A calculates the difference between the brightness value corresponding to the point "a" and the brightness value corresponding to the point "e", the difference between the brightness value corresponding to the point "e" and the brightness value corresponding to the point "f", the difference between the brightness value corresponding to the point "f" and the brightness value corresponding to the point "b", the difference between the brightness value corresponding to the point "b" and the brightness value corresponding to the point "g", the difference between the brightness value corresponding to the point "g" and the brightness value corresponding to the point "h", the difference between the brightness value corresponding to the point "h" and the brightness value corresponding to the point "c", the difference between the brightness value corresponding to the point "c" and the brightness value corresponding to the point "i", the difference between the brightness value corresponding to the point "i" and the brightness value corresponding to the point "j", and the difference between the brightness value corresponding to the point "j" and the brightness value corresponding to the point "d", respectively.

The operation goes to a step ST33 in which the extreme-values-detecting means 74A compares each of the calculated differences between the adjacent maximum and minimum values with the noise standard value previously stored in RAM 8 or ROM 9. If the calculated difference between the adjacent maximum and minimum values is smaller than the noise standard value, the extreme-values-detecting means 74A determines that these maximum and minimum values are noise and the operation goes to a step ST34. If the calculated difference between the adjacent maximum and minimum values is larger than the noise standard value, the extreme-values-detecting means 74A determines that these maximum and minimum values are not noise and the operation goes to the step ST25 shown in FIG. 10.

At the step ST34, the extreme-values-detecting means 74A removes the maximum and minimum values determined as noise and the operation goes to the step ST25 shown in FIG. 10.

Thus, in ASIC 7A according to this embodiment, the extreme-values-detecting means 74A for removing noise from the brightness values is provided so that it becomes possible to remove any noise from the code symbol data, thereby enabling the code symbol to be more reliably recognized This enables a code scanner of improved reliability to be provided.

Third Embodiment

In this embodiment, there will be described ASIC 7B which identifies the position of the code symbol. Since elements having names and signs like those of the above-mentioned embodiments have like functions, the explanation thereof will be omitted.

Configuration Example of ASIC 7B

Figure 12:
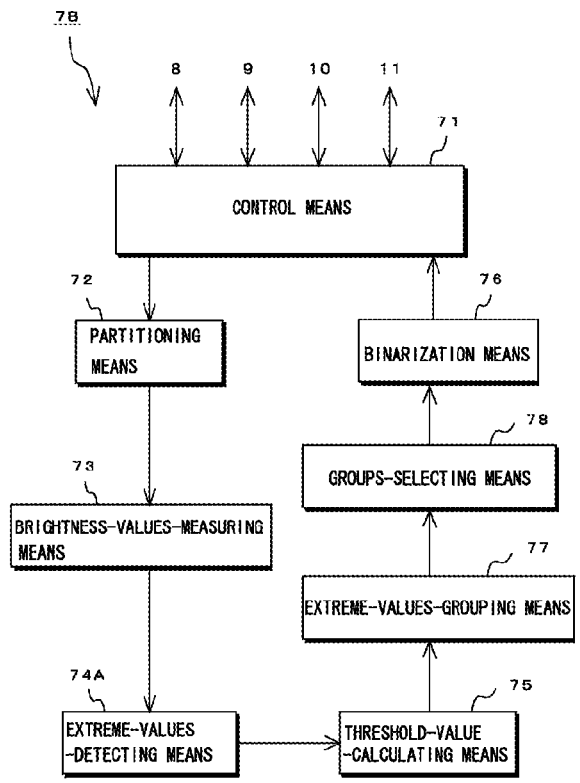
FIG. 12 is a block diagram of ASIC 7B according to a third embodiment for showing a configuration example thereof.

As shown in FIG. 12, ASIC 7B according to this embodiment has a control means 71, a partitioning means 77, a brightness-values-measuring means 73, an extreme-values-detecting means 74A, a threshold-value-calculating means 75 a binarization means 76, an extreme-values-grouping means 77 and a groups-selecting means 78.

To the threshold-value-calculating means 75, the extreme-values-grouping means 77 is connected. The extreme-values-grouping means 77 counts the blocks partitioned by the partitioning means 72, determines whether or not there is a threshold value in the counted block and if there is a threshold value, groups adjacent blocks, in which there is a threshold value, to generate groups. In other words, the extreme-values-grouping means 77 groups plural adjacent blocks, the threshold values of which are calculated by the threshold-value-calculating means 75, to generate the groups.

Figure 13:
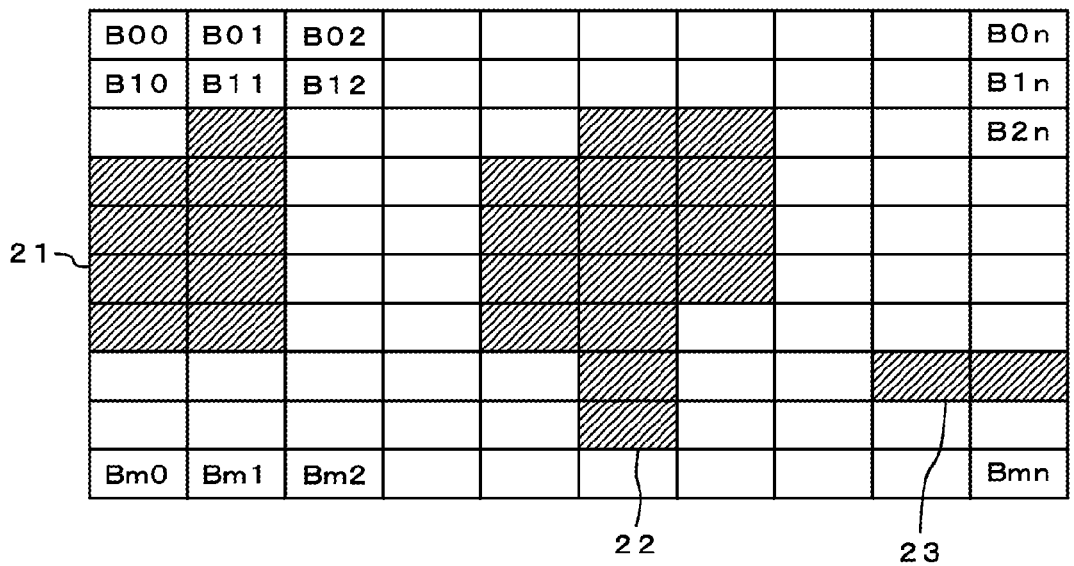
FIG. 13 is a diagram for showing a grouped example by an extreme-values-grouping means 77 and a selected example of a groups-selecting means 78.

In FIG. 13, the blocks counted by the extreme-values-grouping means 77, in each of which there is a threshold value, are shown by oblique lines. The extreme-values-grouping means 77 groups blocks, in each of which there is a threshold value, to generate first groups (hereinafter, referred to as "groups 21"), second groups (hereinafter, referred to as "groups 22") and third groups (hereinafter, referred to as "groups 23").

To the extreme-values-grouping means 77, the groups-selecting means 78 is connected. The groups-selecting means 78 compares an area of each of the groups generated by the extreme-values-grouping means 77 with a predetermined area for a comparison standard, which has been previously stored in RAM 8 and ROM 9, to determine whether or not the areas of the groups are larger than the predetermined area. If the area of the groups is larger than the predetermined area, these groups are selected and the threshold vales of the groups are outputted to the binarization means 76. If the area of the groups is smaller than the predetermined area, the groups are canceled.

As shown in FIG. 13, for example, the groups 21 and 22 are larger than the predetermined area so that the threshold values stored in the groups 21 and 22 are outputted to the binarization means 76. The groups 23 are smaller than the predetermined area so that the groups 23 are canceled.

Accordingly, ASIC 7B can recognize that the code symbols exist at positions of these groups 21 and 22.

Operation Example of ASIC 7B

Figure 14:
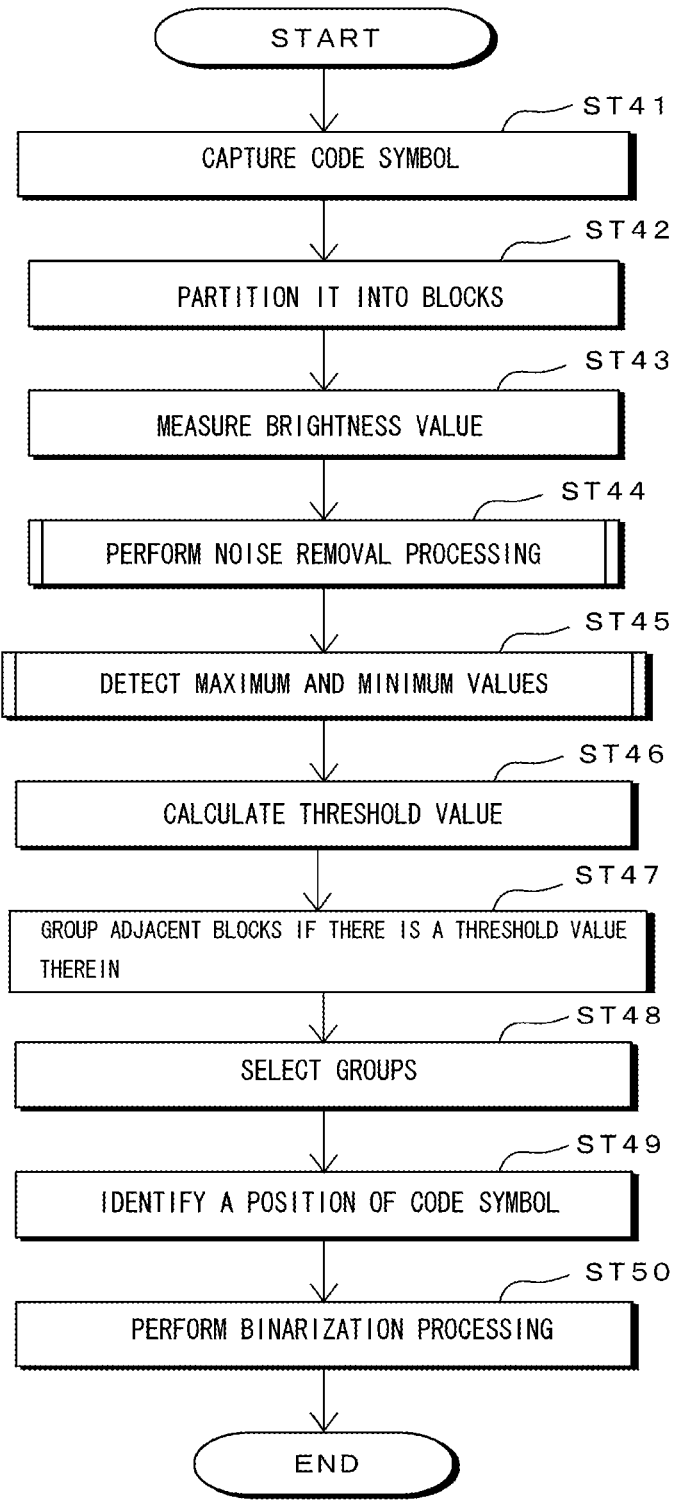
FIG. 14 is a flow chart for showing an operation example of ASIC 7B.
Figure 15:
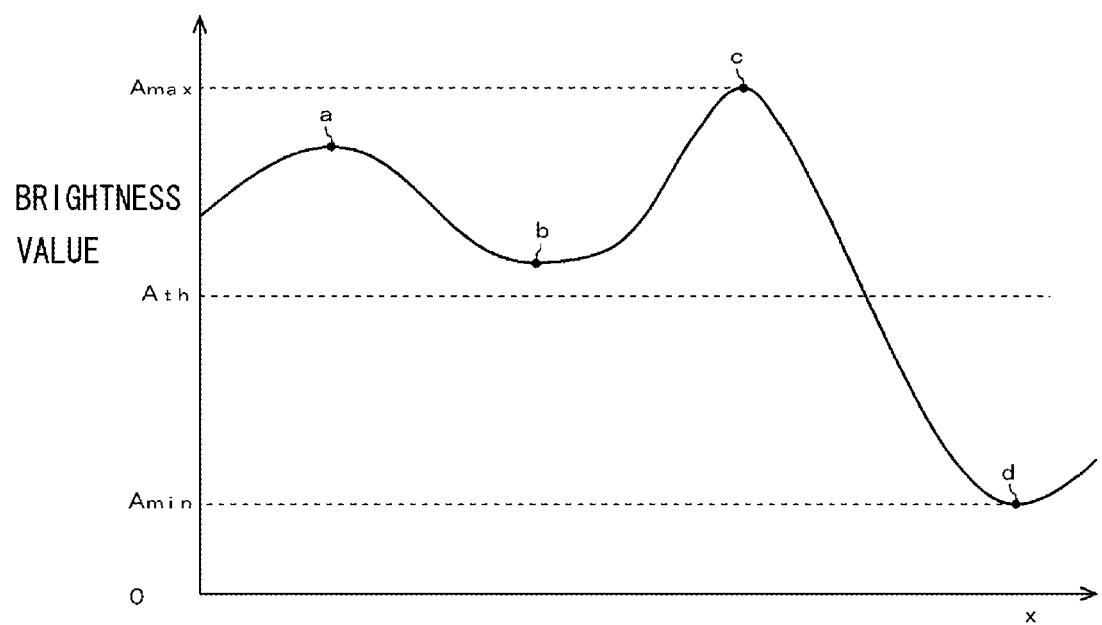
FIG. 15 is a diagram for showing a conventional calculation example of threshold value.

Next, there will be described an operation example of ASIC 7B using a flow chart therefor. As shown in FIG. 14, steps ST41 through ST46 and ST50 are identical to the steps ST21 through ST26 and ST27 shown in FIG. 10 as described above, the explanation of which will be omitted.

At a step ST47, the extreme-values-grouping means 77 counts time blocks partitioned by the partitioning means 72 into (m+1)×(n+1) pieces one by one and determines whether or not there is a threshold value in each of the counted blocks. The counted block is referred to as the block in which the threshold value is calculated by the threshold-value-calculating means 75. The extreme-values-grouping means 77 groups the adjacent blocks if there is a threshold value therein, to generate the groups 21, 22 and 23. The extreme-values-grouping means 77 does not group the blocks if there is no threshold value or no adjacent blocks.

The operation goes to a step ST48 in which the groups-selecting means 78 compares an area of each of the groups 21, 22 and 23 with a predetermined area for a comparison standard, which has been previously stored in RAM 8 and ROM 9. For example, it is set to select the groups which are larger than four blocks and to cancel the groups which are less than four blocks. If so, the groups-selecting means 78 is configured so as to select the groups 21 and 22 and cancel the groups 23.

The operation goes to a step ST49 in which ASIC 7B identifies positions of the selected groups 21 and 22 and recognizes that the code symbols exist at these positions.

Thus, in ASIC 7B according to this embodiment, the extreme-values-grouping means 77 and the groups-selecting means 78 for identifying a position of the code symbol is provided so that it becomes possible to identify the position of the code symbol. This enables the code symbol to be more reliably recognized This results in a code scanner in which reliability is improved.

It is to be noted that although it has been explained that ASIC 7B according to this embodiment identifies the positions of the selected groups 21 and 22 after the groups-selecting means 78 has selected the groups 21 and 22 and ASIC 7B recognizes that the code symbols exist at these positions, ASIC 7B may measure the density of maximum values given by (number of the maximum values)/(grouped area) after the groups-selecting means 78 has selected the groups 21 and 22 and recognize this area having a high density of the maximum values as one at which the code symbol exists.

DESCRIPTION OF REFERENCE CODES

1: Code Scanner; 2: Optical Head Portion; 3: Lens; 4: CMOS Image Sensor; 5: LED; 6: Decoder Portion; 7: ASIC; 8: RAM; 9: ROM; 10: First I/O; 11: Second I/O; 21: First groups; 22: Second Groups; 23: Third Groups; 71: Control Means; 72: Partitioning Means; 73: Brightness-Values-Measuring Means; 74, 74A: Extreme-Values-Detecting Means; 75: Threshold-Value-Calculating Means; 76: Binarization Means; 77: Extreme-Values-Grouping Means; 78: Groups-Selecting Means.

The invention claimed is:

1. An optical information-reading apparatus comprising:
an image-capturer capturing an image to convert the image to image data that is represented by a digital brightness value;
a partitioner partitioning the image data converted by the image-capturing means into blocks; a brightness-values-measurer measuring brightness values of the image data partitioned into blocks by the partitioning means for every line;
an extreme-values-detector comparing the brightness values of the image data of blocks measured by the brightness-values-measuring means for every line and detecting maximum and minimum values thereof;
a threshold-value-calculator calculating a binarization threshold value for a block based on the maximum and minimum values detected by the extreme-values-detecting means;
an extreme-values-grouper grouping plural adjacent blocks, the threshold values of which are calculated by the threshold-value-calculator, to generate groups;
a groups-selector comparing the groups generated by the extreme-values-grouper with a predetermined size to determine whether or not the groups are larger than the predetermined size and selecting the groups if they are larger than the predetermined size; and
a binarizer binarizing the brightness value of the image data with the threshold value for blocks in the groups selected by the groups-selector.

2. The optical information-reading apparatus according to claim 1, wherein when there are plural maximum values and minimum values in one block partitioned by the partitioner, the extreme-values-detector selects the smallest maximum value among the plural maximum values and the largest minimum value among the plural minimum values.

3. The optical information-reading apparatus according to claim 1, wherein the threshold value is the mean value between the maximum value and a minimum value.

4. The optical information-reading apparatus according to claim 1, wherein the extreme-values detector removes noise from the image data.

5. The optical information-reading apparatus according to claim 4 wherein storage means is connected to the extreme-values-detector,
the storage means stores the noise last determined by the extreme-values-detector as a noise standard value, and
the extreme-values-detector removes noise based on the noise standard value stored in the storage means.

6. The optical information-reading apparatus according to claim 4 wherein storage means is connected to the extreme-values-detector,
the storage means previously stores a noise standard value, and
the extreme-values-detector removes noise based on the noise standard value previously stored in the storage means.

7. An optical information-reading method comprising the steps:
(a) capturing an image to convert the image to image data that is represented by a digital brightness value;
(b) partitioning the image data converted in step (a) into blocks;
(c) measuring the image data partitioned into blocks in step (b) for every line;
(d) comparing the brightness values of the image data of each block measured for every line in step (c) and detecting maximum and minimum values thereof;
(e) calculating a binarization threshold value for every block based on the maximum and minimum values detected in step (d);
(f) grouping plural adjacent blocks, the threshold values of which are calculated in step (e), to generate groups;
(g) comparing an area of each of the groups generated in step (f) with a predetermined area for a comparison standard; and
(h) selecting the groups if the area of each of the groups compared in step (g) is larger than the predetermined area and binarizing the brightness value of the image data with the threshold value for every block in the selected groups.

* * * * *